United States Patent [19]

Horn

[11] Patent Number: 4,655,347

[45] Date of Patent: Apr. 7, 1987

[54] COLLECTIVE PACK FOR PROTECTIVE COVERINGS CONSISTING OF PLASTIC FOIL, FOR MOTOR-VEHICLE PARTS SUCH AS THE SEATS, STEERING WHEEL, FLOOR OR THE LIKE

[76] Inventor: Jörg Horn, Friedrich-Ebert-Strasse 105, D-3578 Schwalmstadt, Fed. Rep. of Germany

[21] Appl. No.: 854,054

[22] Filed: Apr. 18, 1986

Related U.S. Application Data

[63] Continuation of Ser. No. 643,664, Aug. 23, 1984, abandoned.

[30] Foreign Application Priority Data

Aug. 30, 1983 [DE] Fed. Rep. of Germany ....... 3331171
Nov. 17, 1983 [DE] Fed. Rep. of Germany ....... 3341541

[51] Int. Cl.⁴ .............................................. B65B 67/04
[52] U.S. Cl. ..................... 206/390; 206/391; 206/494
[58] Field of Search ............... 206/390, 391, 494, 408; 248/95

[56] References Cited

U.S. PATENT DOCUMENTS

| | | | |
|---|---|---|---|
| 2,320,835 | 6/1943 | Tathwell | 206/391 |
| 2,589,641 | 3/1952 | Stewart | 206/391 |
| 3,956,782 | 5/1976 | Morrison | 206/390 |
| 4,010,299 | 3/1977 | Hershey, Jr. et al. | 206/494 |
| 4,349,123 | 9/1982 | Yang | 206/494 |
| 4,364,490 | 12/1982 | Lang et al. | 206/390 |

Primary Examiner—Joseph Man-Fu Moy
Attorney, Agent, or Firm—Max Fogiel

[57] ABSTRACT

An arrangement in which protective coverings for vehicle parts, such as seats, floor, steering wheel or the like, are carried by a substantially long sheet of plastic foil. The coverings are connected to one another by perforations that run transversely to the longitudinal axis of the foil sheet. The plastic foil sheet is folded in at least one longitudinal fold and then rolled up on a solid core to form a compact supply roll which serves as a dispensing unit. The protective coverings can be severed individually in succession from this dispensing unit. Two edges of the foil are folded along the longitudinal axis inwardly, so that the two edges are in contact within parts of the foil that faced each other as a result from the first-mentioned longitudinal fold.

11 Claims, 9 Drawing Figures

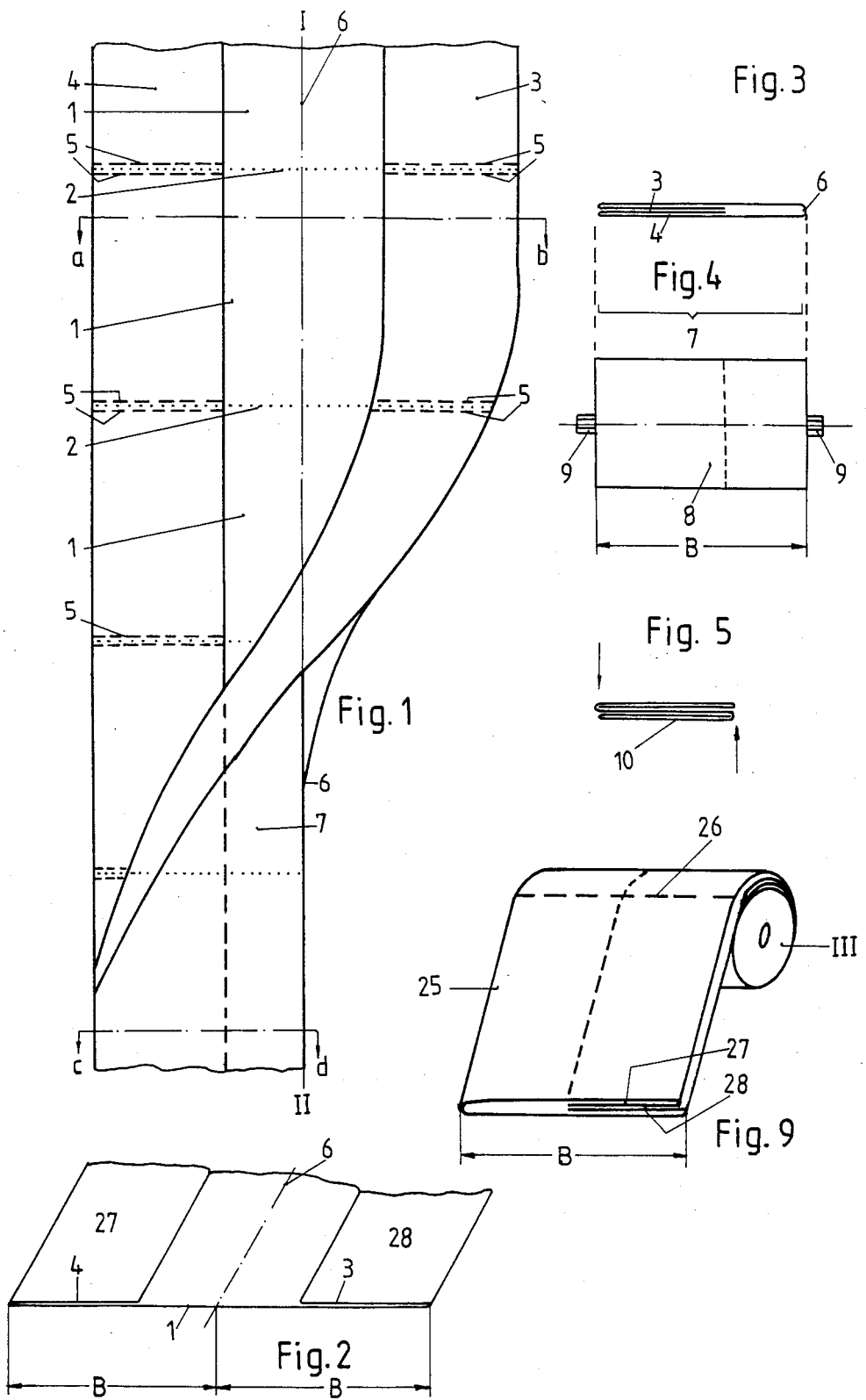

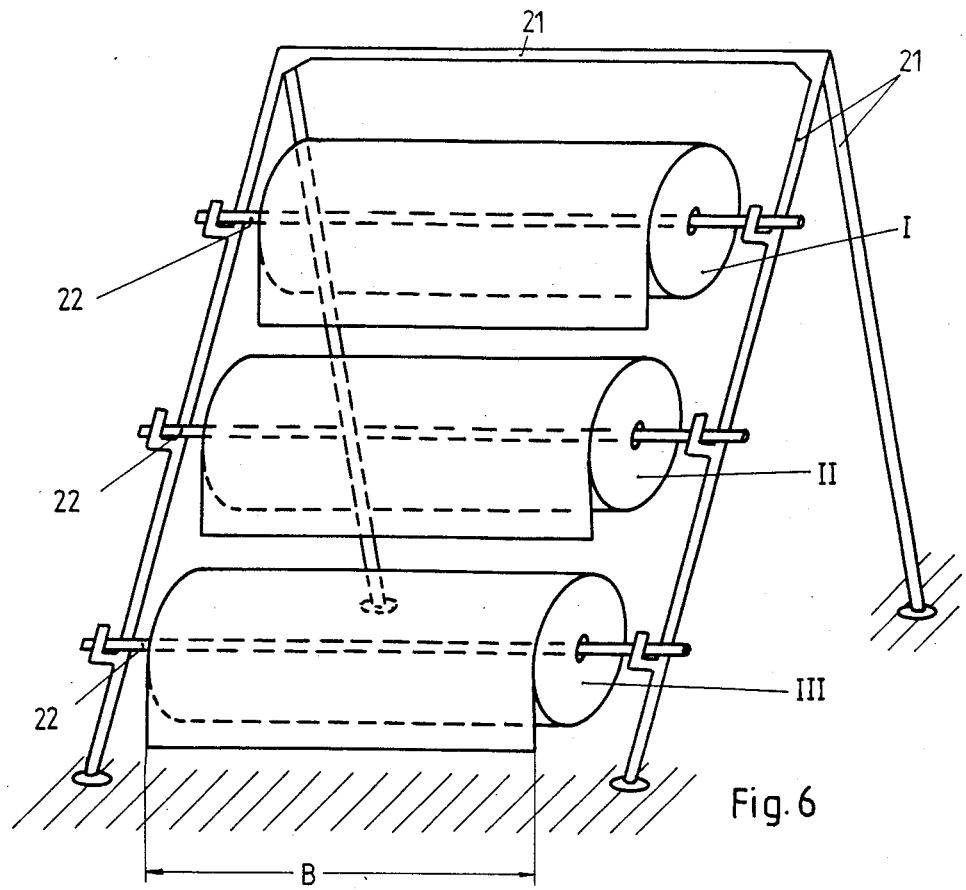
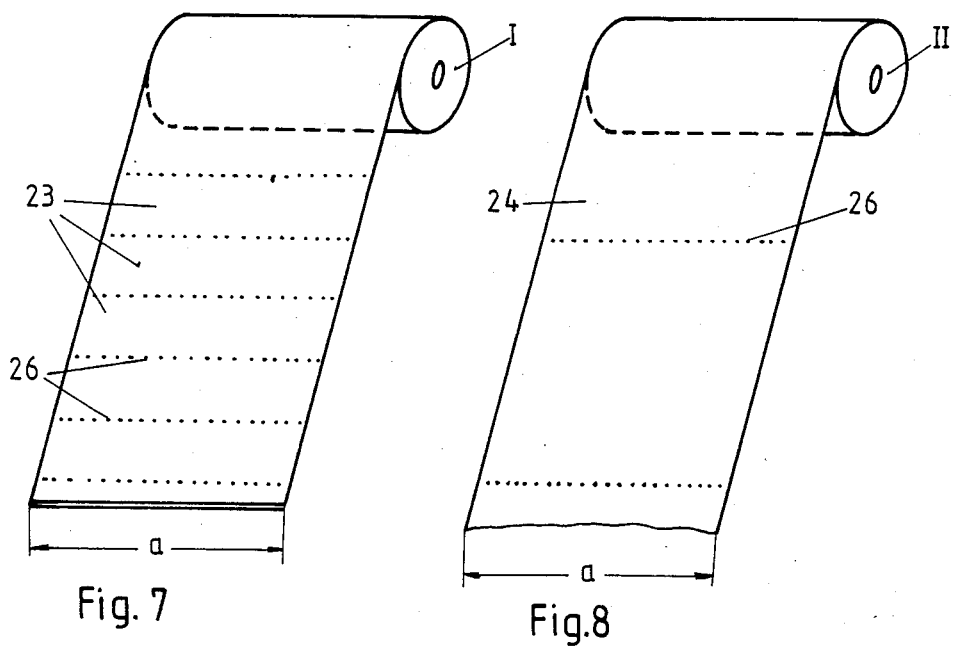

COLLECTIVE PACK FOR PROTECTIVE COVERINGS CONSISTING OF PLASTIC FOIL, FOR MOTOR-VEHICLE PARTS SUCH AS THE SEATS, STEERING WHEEL, FLOOR OR THE LIKE

This application is a continuation of Ser. No. 643,664, filed Aug. 23, 1984, now abandoned.

The invention relates to a collective pack for protective coverings consisting of plastic foil, for motor-vehicle parts such as the seats, floor, steering wheel or the like. These are conventionally separated from one another by means of perforation, can be severed from a relatively long sheet of plastic foil transversely to its longitudinal direction and are used, in particular, in workshops during work in the vehicle, to prevent the vehicle interior from being soiled. Since such protective coverings are destroyed after the work has been carried out, there is a particularly high consumption of protective coverings. This makes it difficult to keep such protective coverings in stock, make them available during operation and despatch them from the manufacturer to the consumer. Consequently, after they have been produced, the protective coverings have hitherto been separated from one another and stacked on top of one another, so that it has been possible to remove them from the stack as the occasion has arisen. On the other hand, however, it has also been known to roll the foil sheet up into a roll and sever the individual protective coverings. Both of these possibilities are troublesome and time-consuming, because the individual protective coverings consist of a very thin foil material and often also adhere to one another because of electrostatic charging.

The object of the invention is to eliminate defects of this type and provide a collective pack in the form of a despatch or packaging unit which can be transported in the simplest possible way and, in particular, can be sent as a postal consignment and stacked in large quantities with the least possible space being required. Whenever used, the individual protective coverings are severed in the simplest possible way and provided for use.

This is achieved, according to the invention, because the foil sheet formed from the protective coverings connected to one another is folded in at least one longitudinal fold and then rolled up on a solid core to form a supply roll, from which the individual protective coverings can be severed in succession. The foil sheet is preferably folded longitudinally in such a way that the two overlapping parts lie on the inside of the longitudinally folded foil sheet. The longitudinal folding and rolling up of the plastic foil, which now takes the form of several layers on top of one another, give rise to a relatively short, but compact supply roll which is easy to handle, can be stacked with the least possible space being required and can be separated into individual seat coverings in a simple way.

A further advantage as regards the handling of the supply rolls according to the invention can be achieved if several coverings or covers for vehicle parts of different kinds are combined into a workshop set, so that each of the various covers used for the vehicle is immediately to hand.

Finally, it is also possible to supplement such a workshop set with covering foils for the entire vehicle or for vehicle parts, such as the vehicle wheels, mudguards, windscreen or the like, which can likewise be supplied in roll form and which can be severed from the supply rolls as individual pieces.

The idea of the invention, which admits of a very wide variety of possible embodiments, is reproduced in the attached drawings in which:

FIG. 1 shows a portion of a foil sheet formed from individual protective coverings still connected to one another;

FIG. 2 shows a section through the foil sheet according to FIG. 1 along the line a-b;

FIG. 3 shows a section through the already longitudinally folded foil sheet along the line c-d;

FIG. 4 shows a plan view of a supply roll which is formed from the already longitudinally folded foil sheet;

FIG. 5 shows a sectional representation of a foil sheet folded longitudinally several times;

FIG. 6 shows a stand to be used in workshops and provided with supply rolls for a workshop set;

FIGS. 7 and 8 show perspective representations of individual supply rolls with protective coverings for different intended uses, and FIG. 9 shows a perspective view of a protective-covering roll for vehicle seats.

According to FIG. 1, the foil sheet is formed from an appropriate number of protective coverings 1 which are connected to one another and between any two of which there is a perforation 2. The distance between the perforations 2 determines the width of the protective coverings 1 according to the width of the vehicle seat. Each protective covering 1 has an upper overlapping part 3, forming a pocket, which is to be pulled over the backrest of a motor-vehicle seat, and a lower overlapping part 4 for receiving or covering the front edge of the seat surface. The side edges of the pockets 3 and 4 are connected by means of welding seams 5. The part remaining between the two parts 3 and 4 serves for covering the remaining backrest or seat surface.

It is also possible, of course, to provide, instead of a pocket 4 extending beyond the front edge of the seat, merely a simple cover extending beyond the front edge of the seat. Finally, it is also possible, however, to provide the protective coverings, in the region of the upper overlapping part 3, with a cut-out, perforation or other formation for receiving or guiding through a headrest.

The design of the individual protective coverings is of no importance for the invention. What is important is that the foil sheet formed from the protective coverings 1 connected to one another is folded longitudinally, for example along the centre line I-II, thus forming by means of the centre fold 6 a correspondingly narrower sheet 7 which can then be rolled up into a supply roll 8 according to FIG. 4. Rolling up can be carried out via an axle 9, a cardboard roller or the like.

The width of the roll 8 is chosen according to the particular conditions which prevail. If appropriate, it is even possible to provide a multiple longitudinal fold, as shown in FIG. 5, this being particularly advantageous for protective coverings which are provided with only one pocket receiving the backrest, an even narrower sheet 10 to be rolled up being obtained as appropriate. The longitudinal folding and rolling up into a roll increase the compactness and stability of the sheet. The foil remains smooth and allows the individual protective coverings to be torn off along the perforation, as required, at any time.

When a so-called workshop set is formed from different types of protective coverings, a supporting stand according to FIG. 6 is appropriately used. These different supply rolls I, II and III are mounted above one another and ready to hand in a stand 21, so as to be exchangeable and rotatable, by means of an axle 22, as can be seen in FIG. 6. Thus, for example, the supply roll I consists of an appropriately long sheet composed of a flattened tube which is to be divided into individual protective foils 23 for steering wheels by means of transverse perforations 26. An expandable plastic foil consisting of polyethylene or polyamide or the like is used as the material.

The supply roll II is formed, for example, from an appropriately long paper sheet, such as wrapping paper, crepe paper, felt paper or the like, which is again to be divided into individual floor covers 24 by means of perforations 26.

The protective coverings for vehicle seats are rolled up on the further supply roll III. In the rolled-up state, the roll width corresponds to the dimension "B". The individual protective coverings extend transversely to the longitudinal direction of the sheet and are divided from one another by the perforations 26. To obtain the permissible roll width, for example the roll sheet, formed from protective coverings for vehicle seats, connected to one another, is folded longitudinally between the seat part 27 and the backrest part 28 according to the broken line in FIG. 9. The length of the protective coverings 25 accordingly corresponds to 2×"B". Correspondingly, the supply roll III has a relatively larger diameter when as many protective coverings as there are floor covers 24 or steering-wheel covers 23 are rolled up onto it.

When the above-described workshop set is supplemented with covers for the vehicle or vehicle parts, such as the mudguards, windscreen, vehicle wheels, etc., these are likewise rolled up in supply rolls and can be severed by means of perforations arranged in an appropriate way. Supply rolls of this type can be suspended in the same stand as described above or can be accommodated in their own stands, thus making it easier to use them in another part of the workshop.

The dimensions of the individual supply rolls will appropriately correspond approximately to one another in width and satisfy the particular transport conditions. The roll diameter can vary. Appropriately, approximately the same number of set parts are provided on each supply roll. The relatively small width makes it possible to deal in, despatch and use replacement supply rolls in the simplest possible way.

When the stand illustrated in FIG. 6 is erected with the three supply rolls I, II and III suspended in it, then, when any vehicle comes into the workshop, a workshop set formed from the parts 23, 24 and 25 can be severed and pulled over the corresponding vehicle part. After use, the supply rolls can easily be exchanged.

The relatively small width of supply rolls of this type makes it possible to present the sets in sales rooms, despatch replacement rolls more cheaply and more safely because of greater stability, and deal in them and use them in the simplest possible way.

I claim:

1. Collective pack for protective coverings for vehicle parts, such as the seats, floor, steering wheel and the like, comprising: a substantially long sheet of plastic foil carrying sets of said protective coverings, each set of protective coverings having different coverings corresponding to different parts of a vehicle, said foil having a longitudinal axis; perforations in said foil and transverse to said longitudinal axis, said coverings being severable from one another by said perforations, said coverings being connected to one another in said long sheet of plastic foil transversely to said longitudinal axis; said foil sheet being formed from said protective coverings connected to one another and being folded in at least one longitudinal fold and then rolled on a solid core to form a compact supply roll, said supply roll comprising a dispensing unit, said protective coverings being severable individually in succession from said dispensing unit, two edges of said foil being folded along said longitudinal axis, said one longitudinal fold folding together two parts of foil facing each other along said longitudinal axis, said two edges of said foil being folded inwardly within a gap between said folded two parts of foil, said two edges being in contact within said gap, said collective pack of protective coverings comprising different coverings combined in one set for covering different parts of a vehicle to protect the vehicle parts against becoming soiled when the vehicle is placed in a repair shop by providing shop personnel with easy access to the different coverings necessary for protecting the vehicle while under repair.

2. Collective pack according to claim 1, wherein said longitudinal fold of said sheet of foil is such that said two edges comprise two overlapping parts lying on the inside of said longitudinally folded sheet of foil.

3. Collective pack according to claim 1, wherein said sheet of foil is folded in several longitudinal folds and rolled up.

4. Collective pack according to claim 1, wherein a plurality of supply rolls are combined with protective coverings for different uses into a workshop type of set of units.

5. Collective pack according to claim 4, including a common supporting structure for holding said plurality of supply rolls with said protective coverings forming said set of units held in said common supporting structure.

6. Collective pack according to claim 1, wherein said supply rolls have a size which allows shipment by mail.

7. Collective pack according to claim 4, wherein said workshop set of units has covering foils for different vehicle parts, each covering for a different vehicle part being on a separate supply roll so that coverings for a predetermined vehicle part can be severed and dispenses from its own supply roll.

8. A collective pack according to claim 5, wherein said supporting structure is a movable structure.

9. A collective pack according to claim 5, wherein said supporting structure is a stationary structure.

10. A collective pack according to claim 5, wherein said supporting structure comprises a wall mounting.

11. Collective pack for protective coverings for vehicle parts, such as the seats, floor, steering wheel and the like, comprising: a substantially long sheet of plastic foil carrying said protective coverings, each set of protective coverings having different coverings corresponding to different parts of a vehicle, said foil having a longitudinal axis; perforations in said foil and transverse to said longitudinal axis, said coverings being severable from one another by said perforations, said coverings being connected to one another in said long sheet of plastic foil transversely to said longitudinal axis; said foil sheet being formed from said protective coverings connected to one another and being folded in at least one longitudinal fold and then rolled up on a solid core to form a compact supply roll, said supply roll comprising a dispensing unit, said protective coverings being severable individually in succession from said dispensing unit, two edges of said foil being folded along said longitudinal axis, said one longitudinal fold folding together two parts of foil facing each other along said longitudinal axis, said two edges of said foil being folded inwardly within a gap between said folded two parts of foil, said two edges being in contact within said gap; a plurality of supply rolls combined with protective coverings for different uses into a workshop type of set of units; a common supporting structure for holding said plurality of supply rolls with said protective coverings forming said set of units held in said common supporting structure; said supply rolls having a size which allows shipment by mail; said workshop set of units having covering foils for different vehicles parts, each covering for a different vehicle part being on a separate supply roll so that coverings for a predetermined vehicle part can be severed and dispensed from its own supply roll, said collective pack of protective coverings comprising different coverings combined in one set for covering different parts of a vehicle to protect the vehicle parts against becoming soiled when the vehicle is placed in a repair shop by providing shop personnel with easy access to the different coverings necessary for protecting the vehicle while under repair.

* * * * *